April 28, 1970 A. MASON 3,508,287
TORQUE RESPONSIVE WATER LEVEL CONTROL
Original Filed Feb. 14, 1968 2 Sheets-Sheet 1
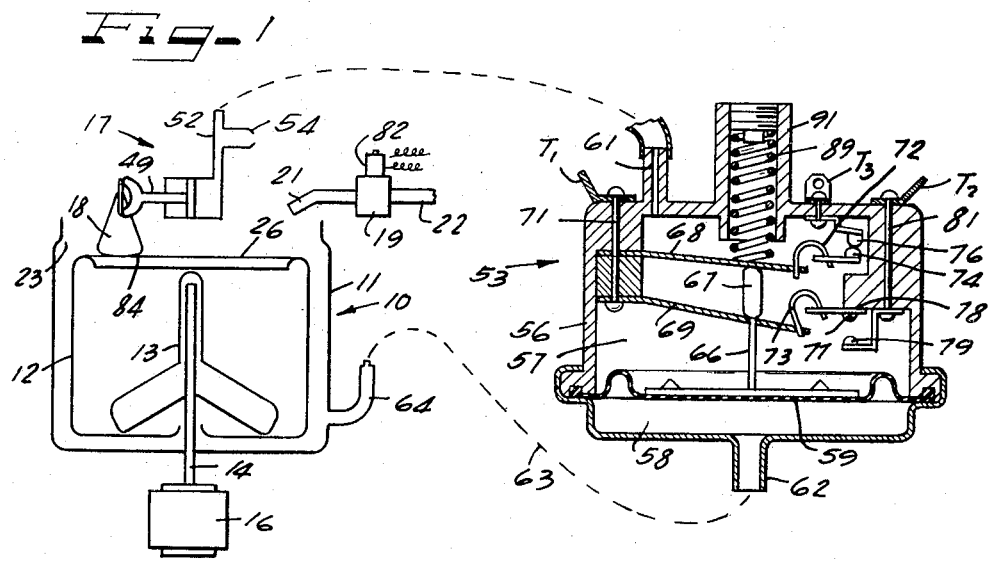
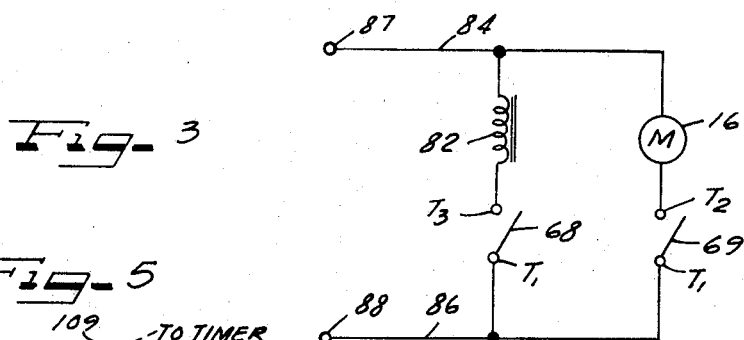
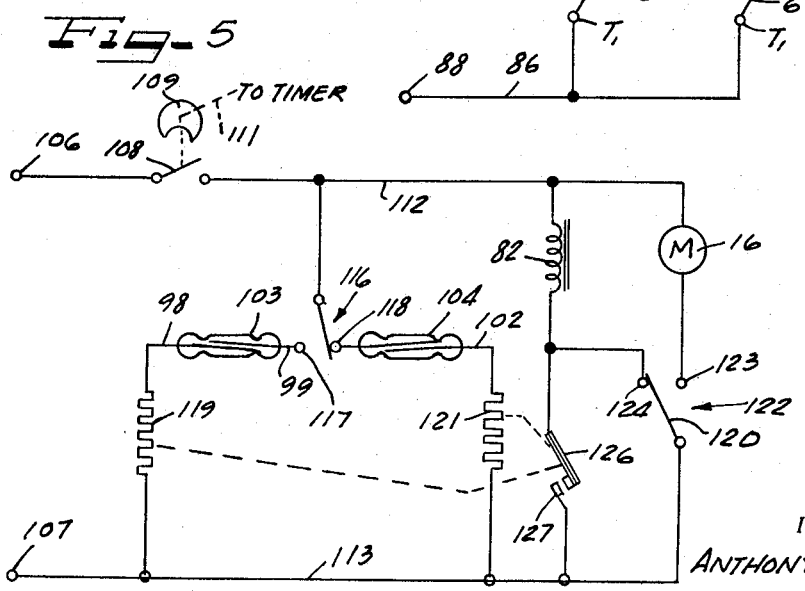
INVENTOR.
ANTHONY MASON April 28, 1970   A. MASON   3,508,287
TORQUE RESPONSIVE WATER LEVEL CONTROL
Original Filed Feb. 14, 1968   2 Sheets-Sheet 2
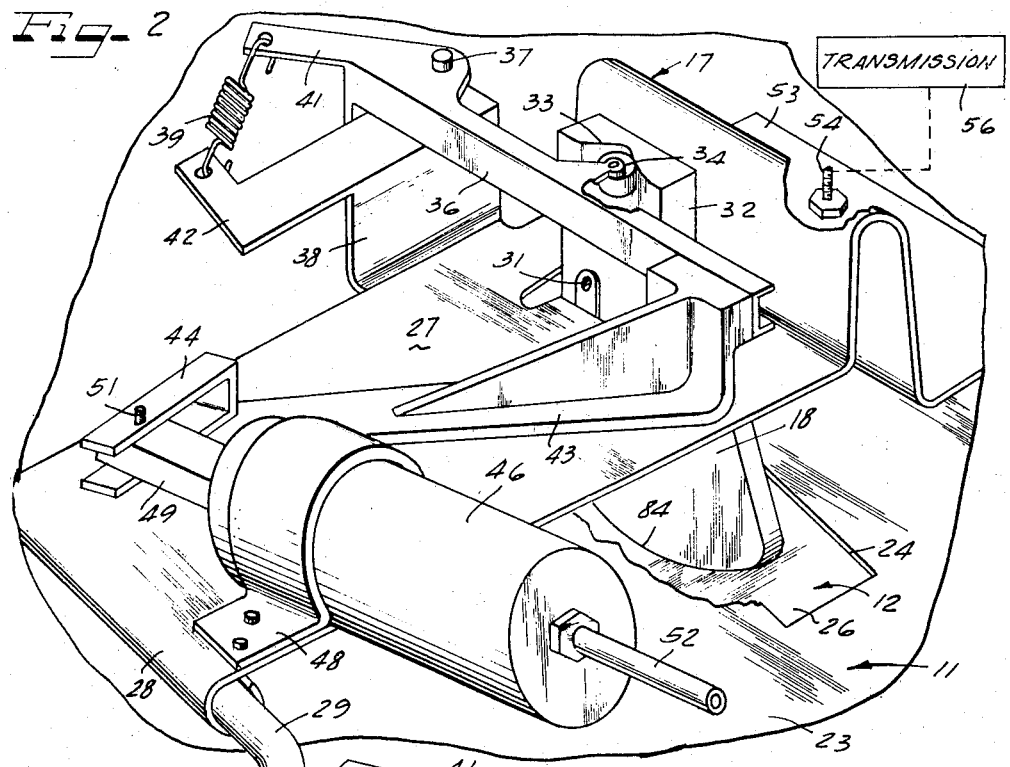
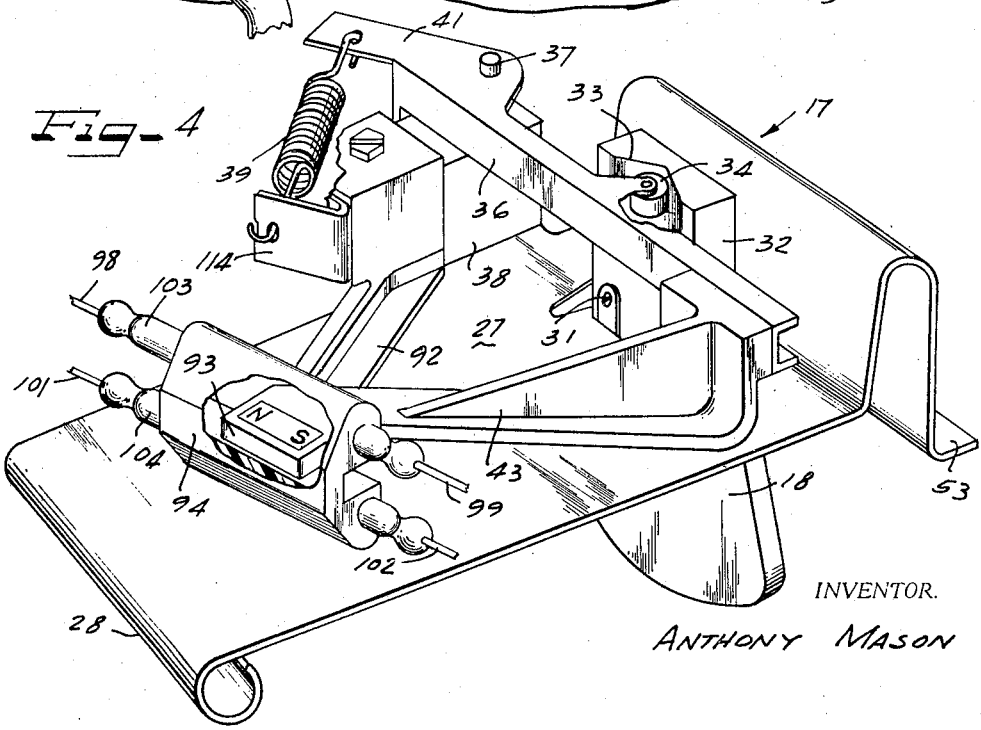
INVENTOR.
ANTHONY MASON United States Patent Office 3,508,287
Patented Apr. 28, 1970

3,508,287
TORQUE RESPONSIVE WATER LEVEL CONTROL
Anthony Mason, St. Joseph, Mich., assignor to Whirlpool Corporation, St. Joseph, Mich., a corporation of Delaware
Original application Feb. 14, 1968, Ser. No. 706,228. Divided and this application July 18, 1969, Ser. No. 842,987
Int. Cl. D06f 39/08
U.S. Cl. 8—158                                       3 Claims

ABSTRACT OF THE DISCLOSURE

A control system for use in an automatic washer to automatically control the quantity of water added to the machine's tub during the wash and rinse operations, so as to maintain water at the proper height, and which utilizes a torque signal generated in the machine by action of the agitator. A sensor is mounted between the tub and basket of the washer to sense motion of the basket relative to the tub, which is proportional to the torque between the agitator and the basket.

CROSS-REFERENCES TO RELATED APPLICATIONS

This is a division of application Ser. No. 706,228, filed Feb. 14, 1968.

BACKGROUND OF THE INVENTION

Field of the invention

The invention relates to automatic washing machines, and in particular to a water level control system which senses the relative motion between the tub and perforate basket within the tub. A feeler is mounted on the top ledge of the tub and extends through an opening to engage the ledge attached to the basket, and motion between the tub and the basket is detected. This motion is proportional to the torque transmitted from the machine's oscillating agitator to the basket through the clothes load and is utilized to control a water valve to reduce the torque to the desired level, which indicates that the water level has reached an appropriate level.

Description of the prior art

Patents to automatic water level controls in washing machines, such as 3,030,790, 3,065,618, and 3,093,841, have disclosed sensing means which sense the absolute motion of the tub of the washer. The present invention senses the relative motion between the tub and the perforate basket mounted within the tub and uses this relative motion as a control for the water valve. If the water level to too low for the particular load of articles being washed, substantial torque exists between the agitator and the perforate basket which will causes the perforate basket to move relative to the tub. When the level of water has reached an optimum, the torque between the agitator and basket will be less. Thus the present invention detects the relative motion between the tub and the perforate basket to control the water valve.

BRIEF SUMMARY OF THE INVENTION

Relative motion between the perforate basket in an automatic washer and the tub is detected by a sensing means which is capable of converting relative motion between these members to either an electrical or pneumatic or other type of signal. The signal thus produced is proportional to the torque existing between the agitator and the basket and is used to control the water inlet valve so that an optimum level of fluid exists in the tub. The sensor producing a pneumatic signal is used with a novel pneumatic switch which could be utilized not only in the apparatus disclosed in this invention but also could be used with other systems.

The water level control according to this invention provides the correct amount of water for a given load regardless of the type of fabric being laundered or the load size. This insures optimum washing action since agitation of clothing in too little water may damage fabrics, whereas agitation of fabric in too much water doesn't allow proper washing action of fabrics by the agitator.

Hot water is saved because the tub will not be filled above the level necessary to launder the clothing. This saves both water consumption and fuel.

Laundering detergent or soap is saved because the amount of detergent needed is proportional to the water level.

The water level control contributes to longer life of the washer, since torque transmitted by the agitator to the basket through the clothing is reduced to a minimum.

Other objects, features and advantages of the present invention will be readily apparent from the following detailed description of certain preferred embodiments thereof taken in conjunction with the accompanying drawings.

BRIEF DESCRIPTION OF THE DRAWINGS

FIG. 1 is a schematic illustration of a washing machine and a sectional view of the novel pressure switch according to this invention.

FIG. 2 is a perspective view of the torque sensing means of this invention with a pneumatic modification.

FIG. 3 is a schematic view of the electrical control circuit of this invention.

FIG. 4 is a perspective view of the electrical modification of the torque sensing means of this invention.

FIG. 5 is a schematic view illustrating the control circuit utilized with the electrical torque sensing means.

DESCRIPTION OF THE PREFERRED EMBODIMENT

FIG. 1 schematically illustrates an automatic washer designated generally as 10 which has a water-containing tub 11 and a rotatable perforate basket 12 mounted within the tub 11. An agitator 13 is mounted within the tub 12 on a drive shaft 14, which is driven in an oscillatory fashion through a transmission by a motor 16. A sensing module 17 is mounted on the tub 11 and has a sensing pendulum 18 which engages the basket 12. Relative motion between the basket 12 and the tub 11 is proportional to torque coupled from the agitator 13 through the clothing load to basket 12, and is utilized to control a water supply valve 19 which has an outlet 21 and an inlet 22 connected to a suitable water supply.

FIGS. 2 and 4 illustrate the sensing module 17 in detail. FIG. 2 illustrates an embodiment in which the sensing module produces a pneumatic output, and FIG. 4 illustrates a modification in which an electrical output is produced by the sensing module 17. As shown in FIGS. 1 and 2, the tub 11 has an inturned flange 23 to which the sensing means 17 is mounted. The flange 23 is formed with an opening 24 and the sensing pendulum 18 of the sensing means extends through the opening 24 and engages a ledge 26 formed on the basket 12. The sensing means 17 comprises a mounting bracket 27 which has one end 28 pivotally attached to the ledge 23 by a mounting hinge 29. The sensing pendulum 18 is pivotally attached to bracket 27 by pin 31.

The bottom of the pendulum 18 is arcuate in shape and moves with relative motion between the basket 12 and the tub 11. The upper portion 32 of the pendulum 18 is formed with a cam surface 33 in one face thereof in which a roller 34 is received. Roller 34 is rotatably supported on a cross-bar 36. Cross-bar 36 is pivotally attached by a pin 37 to an extension 38 of the bracket 27. A spring 39 biases the cross-bar 36 so that the roller 34 is in engagement with the cam surface 33. Spring 39 is attached to an arm 41 on the cross-bar 36 and to an extension 42 attached to bracket portion 38. An arm 43 is attached to a cross-bar 36 and carries a yoke 44 at its outer end. A cylinder 46 is attached to bracket 27 by a clamp 48 and has a piston which has a shaft 49 which extends from the cylinder 46. The shaft 49 is connected to the yoke 44 by a pivot pin 51. A conduit 52 is connected to the cylinder 46. The end 53 of the bracket 27 opposite the pivot area 28 is supported by a shaft 54 which is linked to a transmission 56 of the washer. When the washing machine goes into a spin phase of operation, the transmission lifts the bracket 27 so that the pendulum 18 does not engage the ledge 26 of the basket 12 during spin operation. This is to prevent damage to the sensing means during spin operation.

As best shown in FIG. 1, the pneumatic pump comprising the cylinder 46 and piston attached to piston shaft 49 is connected to the novel pressure switch 53 of this invention by the conduit 52. A bleed port 54 is formed in conduit 52 for purpose to be later explained. Pressure switch 53 comprises a casing 56 which is divided into two compartments, 57 and 58, by a diaphragm 59. Conduit 52 is connected to a port 61 which communicates with the space 57 on one side of the diaphragm. A port 62 is connected by conduit 63 to a pressure dome 64 which is connected to the tub 11 to sense the level of liquid within the tub. A push-rod 66 is attached to the diaphragm 59 and carries an engaging portion 67 which is in engagement with the leaf springs 68 and 69 supported from the pressure switch housing. The leaf springs 68 and 69 are electrically connected together by a pin 71 which is in turn electrically connected to a terminal $T_1$. The second end of leaf spring 68 is connected to an over-the-center, generally U-shaped spring 72, and the second end of leaf spring 69 is connected to an over-the-center U-shaped spring 73. A switch contact 74 is connected to leaf spring 72 and engages in the closed position with a switch contact 76 which is connected to a terminal $T_3$. A switch contact 77 is connected to over-the-center spring 73 and in a first position rests against an abutment 78, and in a closed position engages a switch contact 79. Contact 79 is connected by a pin 81 to a terminal $T_2$. A spring 89 is mounted in an extension 91 of pressure switch 53 and biases leaf springs 68 and 69 to the down position shown in FIG. 1, so that the contacts 76, 74, 77 and 79 are in the position as shown in the figure before commencement of the cycle.

FIG. 3 is an electrical schematic of the control circuit, and illustrates a pair of contacts 87 and 88 to which a suitable power supply as for example 120 volts A.C. power is connected. Contact 87 connects to a lead 84 which connects to a solenoid 82 for water control valve 19 and to motor 16, which drives the agaitator and the washer. The other side of the solenoid 82 is connected to contact $T_3$. The other side of the motor 16 is connected to contact $T_2$ of the pressure switch.

The lead 86 is connected through terminal $T_1$ to pin 71 which connects with leaf springs 68 and 69.

In operation, the washer is turned on and the contact $T_1$ engages contact $T_3$ through the spring 68. This energizes solenoid 82 which opens valve 19 to allow water to flow into tub 11. Due to the initial low water level, the pressure dome 64 does not supply sufficient pressure through conduit 63 to cause the diaphragm 59 to move upwardly and thus change the position of the contacts 76, 74, 77, and 79. Since contact 77 does not initially engage contact 79, the motor 16 does not operate during this time. When the water level in the machine reaches a pre-determined level as for example 8 inches, the pressure in pressure dome 64 will be sufficient to cause the diaphragm 59 to move upwardly against the spring 89, thus causing the follower 67 to move springs 68 and 69 upwardly until the over center spring 73 causes switch contact 77 to snap into engagement with contact 79. This energizes motor 16 so that the agitator 13 commences to oscillate. Contacts 76 and 74 remain in engagement.

If there is insufficient water in tub 11 for the clothing load being laundered, torque is transmitted to the basket 12 from the agitator 13 through the clothing load and basket 12 moves relative to the tub 11. The sensing mechanism 17 detects this motion by the pendulum 18 which has its lower cam surface 84 resting on the ledge 26 of the basket 12 moves relative to the tub 11. The sensing mecha- to move back and forth about the pivot pin 31 which in turn moves the cross-arm 36 about pivot pin 37 due to the action of the roller 34 in the cam surface 33. It is to be noted that the cross-arm 36 moves in the same direction from its rest position for either direcion of motion of the pendulum 18 about the pivot pin 31 due to the shape of the cam surface 33. The motion of the cross arm 36 drives the pump comprising the cylinder 46 and the piston shaft 49 which supplies air pressure through conduit 52 to the chamber 57 of the pressure switch 53. The pressure in this chamber tends to counteract the pressure being applied to chamber 58 from the pressure dome 64. Insufficient water in the tub 11 will cause a quick buildup of air pressure in chamber 57 by the pneumatic pump which will prevent the diaphragm 59 from traveling further upwardly so that the contacts 76 and 74 stay engaged and additional water is added. When sufficient water has been added, the pressure in chamber 57 will drop to allow the contacts 74 and 76 to disengage.

If too many clothes are in the basket 12 for the eight-inch level, a large torque is produced and this not only keeps solenoid 82 energized which turns on valve 19 but de-energizes the motor since pressure in chamber 57 will force diaphragm 59 downwardly until contact 77 snaps away from contact 79. This insures that the clothes are not damaged due to insufficient water being in the tub. The water level will then increase until the pressure in pressure dome 64 overcomes the pressure in the cavity 57 at which time the switch contacts again energize the motor 16. If at this time sufficient water has been admitted to the tub, the torque between the tub and the basket will be insufficient to cause the pump to drive the diaphragm 59 downwardly to turn off the motor. The bleeder mechanism 54 allows escape of air from the cylinder 46 and conduit 52 so that slight movements between the tub and the basket do not disable the motor and turn on the water control valve 19.

FIGS. 4 and 5 disclose a modification of the invention wherein the cylinder 46 and pressure switch 53 are replaced by an electrical system. The sensing module 17 is modified so that there is an electrical pickup instead of a pneumatic pickup as in FIGS. 1, 2 and 3. To accomplish this, the arm 43 is modified so that the yoke 44 is removed and a magnet 93 is mounted on the end of arm 43. A reed switch supporting structure 94 is supported by an arm 92 from the portion 38 of the bracket 27. The spring 39 extends between a spring holder 114 and the extension 41 of the cross-bar 36. The reed switch holder 94 has a slot into which the arm 43 extends so that the magnet 93 may move longitudinally relative to the reed switch holder 94. A pair of reed switches 103 and 104 are mounted within the reed holder assembly 94 and may be closed by the magnet 93. Leads 98 and 99 are connected to reed switch 103 and leads 101 and 102 are connected to reed switch 104. Thus, if relative motion occurs between the basket and the tub, the pendulum 18 will cause the cross-arm 36 to move and the magnet 93 will close the switches 103 and 104. If sufficient water is in the tub, the pendulum 18 will move very little and the magnet 93 will not move to close the switches 103 and 104.

The electrical circuitry for this embodiment is shown in FIG. 5. One hundred and twenty volt A.C. is connected to the terminals 106 and 107. A timer, not shown, has an output shaft 111 that drives a cam 109 to close a switch 108 when the washer is turned on. Switch 108 connects power from terminal 106 to lead 112. Lead 112 is connected to one side of motor 16 and to one side of the water control valve solenoid 82. The lead 112 is also connected to the movable contact of a selector switch 116 which may be manually set to engage contacts 117 or 118. Contact 117 is connected to lead 99 of reed switch 103. Contact 118 is connected to lead 101 of reed switch 104. A first heating element 119 is connected to lead 98 and to the other side 113 of the power supply. A heater 121 is connected between lead 102 and the other side 113 of the power supply. A pressure switch 122 has a movable contact 120 which is held by the pressure switch in engagement with a stationary contact 124 when the water level in the tub is below a predetermined level, as for example 8 inches. The pressure switch 122 moves the contact 120 to engage the stationary contact 123 when the water level rises above a predetermined amount, as for example 8 inches. The second side of water control solenoid 82 is connected to contact 124 of switch 122 and to a bimetallic switch arm 126. The bimetallic arm 126 engages a contact 127 which is connected to lead 113.

In operation, the manual switch 116 is moved to engage either contact 117 or 118. Switch 116 is operated by a manually controlled switch on the console of the washer which is preset for either high speed or low speed operation of motor 16 which results in either vigorous or gentle agitation action. Assume that manual switch 116 is initially set such that it engages contact 118 as shown in FIG. 5. When the washer is started, switch 108 will close and supply power to the solenoid valve 82 which turns the water valve on to allow water to enter the tub 11. At this time, the pressure switch 122 is in the position such that switch contact 120 engages contact 124 so that the motor 16 does not operate. When the water reaches a predetermined level as for example 8 inches, the pressure switch 122 will move contact 120 to engage contact 123 and this will start the motor 16. If the level of water within the tub 11 is too low, the sensor 17 will pick up through pendulum 18 relative motion between the tub and the basket. This will cause arm 43 to move and the magnet 93 will close reed switches 103 and 104. Reed switch 104 will supply power to the heater 121. Bimetallic contact 126 is initially out of engagement with contact 127. However, if sufficient torque exists to cause the switch 104 to remain closed for a sufficient time, heater 121 will cause the bimetallic contact 126 to move so that it engages contact 127. When this occurs, power will be supplied from leads 112 and 113 to the solenoid 82 and additional water will be admitted to the tub 11. As the level of water rises in the tub 11, the pendulum 18 will move less and less until the switch 104 is closed an insufficient amount of time to heat heater 121. When this occurs the bimetallic contact 126 will move out of engagement with contact 127 and the solenoid 82 will open.

If the manual switch 116 has been moved so that it engaged contact 117, then the reed switch 103 would supply power to the heater 119 if insufficient water were present in the tub and heat from the heater 119 would cause bimetallic switch 126 to move into engagement with contact 127 thus turning on solenoid valve 82 to allow additional water to enter the tub.

It is to be realized that reed switches 103 and 104 alternately open and close and the intermittent closing of these switches supplies power to the heaters 119 and 121. As the water level rises, less and less torque is transmitted from the agitator to the basket until the reed switches are no longer energized. At this time, power to the heater terminates and the bimetallic switch opens. At this time the water level has been automatically set to the optimum level for the size of the load being laundered. Contacts 117 and 118 correspond to different washing actions. Since the agitator is driven at two speeds depending on the washing action selected, the amount of torque transmitted to the basket depends on agitator speed as well as clothing load and waer level. Thus the bimetallic heaters 119 and 121 have different values which compensate for the difference in torque transmitted to the basket during the two presettable washing actions. The use of the two independent heater circuits assures that with the same clothing load the water level will be the same within the tub.

The principles of the invention explained in connection with the specific exemplifications thereon will suggest many other applications and modifications of the same. It is accordingly desired that in construing the breadth of the appended claims they shall not be limited to the specific details shown and described in connection with the exemplifications thereof.

I claim:

1. The method of controlling the liquid level in a washer having a tub and a basket comprising sensing relative motion between the tub and basket and adding liquid to the tub until the relative motion reaches an acceptable level indicating a proper liquid level.

2. The method of controlling the liquid level in a washer having a tub, a basket and an agitating means located within said basket and wherein relative motion between said tub and basket is a function of the liquid level within said tub, comprising sensing relative motion between the tub and basket, producing a control signal proportional to said relative motion and automatically adding liquid to said tub in response to said control signal until said relative motion has been reduced to an acceptable level.

3. The method according to claim 2 and including deenergizing said agitating means during addition of liquid.

References Cited

UNITED STATES PATENTS

| 3,030,790 | 4/1962 | Davenport et al. | 68—207 X |
| 3,065,618 | 11/1962 | Cobb et al. | 68—207 X |
| 3,093,841 | 6/1963 | Cobb et al. | 8—158 |

WILLIAM I. PRICE, Primary Examiner

U.S. Cl. X.R.

68—207; 137—387